United States Patent
Tanno (10) Patent No.: US 7,556,075 B2
(45) Date of Patent: *Jul. 7, 2009

(54) LOW NOISE PNEUMATIC TIRE

(75) Inventor: Atsushi Tanno, Hiratsuka (JP)

(73) Assignee: The Yokohama Rubber Co., Ltd., Tokyo (JP)

(*) Notice: Subject to any disclaimer, the term of this patent is extended or adjusted under 35 U.S.C. 154(b) by 429 days.

This patent is subject to a terminal disclaimer.

(21) Appl. No.: 10/564,098

(22) PCT Filed: Aug. 4, 2004

(86) PCT No.: PCT/JP2004/011138

§ 371 (c)(1),
(2), (4) Date: Jan. 9, 2006

(87) PCT Pub. No.: WO2005/012008

PCT Pub. Date: Feb. 10, 2005

(65) Prior Publication Data

US 2006/0185777 A1 Aug. 24, 2006

(30) Foreign Application Priority Data

Aug. 4, 2003 (JP) .............................. 2003-285810

(51) Int. Cl.
*B60C 5/00* (2006.01)
*B60C 5/12* (2006.01)
*B60C 19/00* (2006.01)

(52) U.S. Cl. .................. 152/155; 152/157; 152/158; 152/450

(58) Field of Classification Search ................. 152/155, 152/157, 158, 196
See application file for complete search history.

(56) References Cited

FOREIGN PATENT DOCUMENTS

| JP | 62-216803 | | 9/1987 |
|----|-----------|---|--------|
| JP | 09-086113 | | 3/1997 |
| JP | 2000-062408 | | 2/2000 |
| JP | 2002-178712 | * | 6/2002 |
| JP | 2003-048407 | | 2/2003 |
| JP | 2003-226104 | A | 8/2003 |
| JP | 2004-291855 | | 10/2004 |

OTHER PUBLICATIONS

Machine translation of JP 2002-178712- Jun. 2002.*
International Search Report, Nov. 9, 2004.

* cited by examiner

*Primary Examiner*—Justin Fischer
(74) *Attorney, Agent, or Firm*—Greer, Burns & Crain, Ltd.

(57) ABSTRACT

A pneumatic tire having belt-shaped sound absorbing members. The belt-shaped sound absorbing members are mounted on the radially inner surface of the tread facing to the cavity of the pneumatic tire at prescribed intervals circumferentially of the tire by a fixing elastic band. The belt-shaped sound absorbing members each comprise at least one layer formed of a porous material having an apparent density of 10 kg/m$^3$ to 70 kg/m$^3$.

8 Claims, 5 Drawing Sheets

LOW NOISE PNEUMATIC TIRE

TECHNICAL FIELD

The present invention relates to low noise pneumatic tires, and more particularly, to a low noise pneumatic tire which can effectively reduce noise created by acoustic cavity resonance.

TECHNICAL BACKGROUND

There is acoustic cavity resonance produced by vibration of air with which the cavity of a tire is charged, which is one of the sources that create tire noise. The tread of a tire, which comes into contact with a road surface during running of a vehicle, vibrates due to unevenness of the road surface, and this vibration then causes the vibration of air in the cavity of the tire, thereby producing the cavity resonance. It is known that the frequency of sound caught as noise in the cavity resonance is generally about 200 Hz to 300 Hz, differing according to tire sizes. It is thus important to decrease the level of noise in this frequency band in order to reduce tire noise.

As an approach for reducing noise created by such acoustic cavity resonance, it has been proposed to add a sound absorbing member in the cavity of a tire to absorb the resonance sound (see Unexamined Japanese Patent Application Publication No. 62-216803, for example). However, since a sufficient study on the characteristics of the sound absorbing member is not made, it is not necessarily said that effective noise reduction has been achieved.

DISCLOSURE OF THE INVENTION

An object of the present invention is to provide a low noise pneumatic tire that can obtain an effective noise reduction effect by sufficiently utilizing the characteristics of a sound absorbing member.

In order to achieve the above object, the present invention provides a low noise pneumatic tire having a tread, the tread having a radially inner surface facing to a cavity of the tire, belt-shaped sound absorbing members being mounted on the radially inner surface of the tread at prescribed intervals circumferentially of the tire by a fixing elastic band, the belt-shaped sound absorbing members each comprising at least one layer formed of a porous material having an apparent density of 10 $kg/m^3$ to 70 $kg/m^3$.

According to the present invention described above, the belt-shaped sound absorbing members are formed of a porous material, the density of the belt-shaped sound absorbing members is adjusted to the suitable range, and the belt-shaped sound absorbing members are mounted on the radially inner surface of the tread at prescribed intervals by the fixing elastic band, so an acoustic cavity resonance sound can be significantly reduced by a combination of an sound absorbing effect by the porous material of the belt-shaped sound absorbing members and a noise reduction effect due to changes of the resonance frequency by circumferentially intermittently placing the belt-shaped sound absorbing members.

BEST MODES FOR CARRYING OUT THE INVENTION

Embodiments of the present invention will be described in detail below with reference to the attached drawings. Like characters refer to like elements throughout the drawings, and duplicate descriptions will be omitted.

Figure 1:
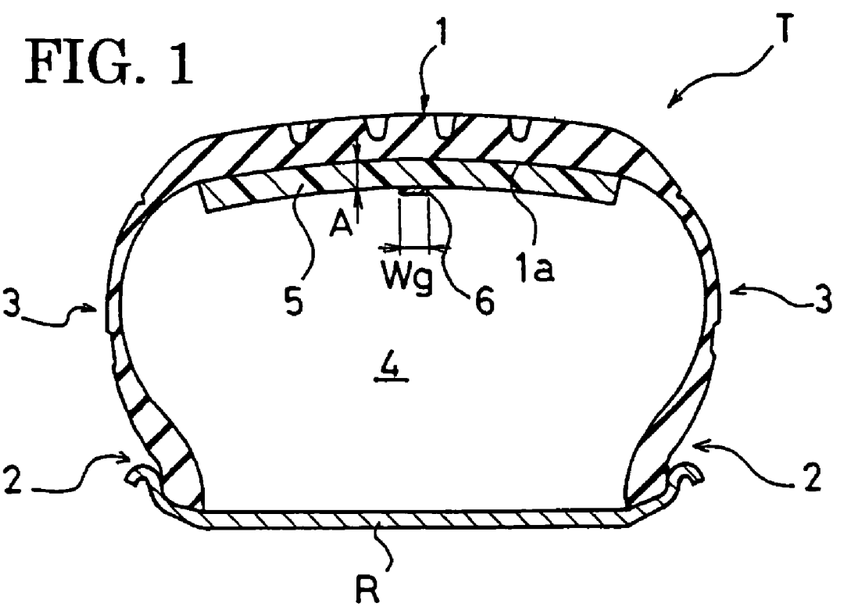
FIG. 1 is a cross-sectional view showing a low noise pneumatic tire according to an embodiment of the present invention in a state where the tire is mounted on a rim and air pressure is applied thereto, taken in a plane that contains the axis of rotation of the tire.

Referring to FIG. 1, the pneumatic tire T includes a tread 1, right and left beads 2, and right and left sidewalls 3 connecting the tread 1 and the beads 2. The tire has a cavity 4 for being charged with air inside. Reference character R denotes a rim on which the pneumatic tire T has been mounted. Although not shown in the drawing, a carcass ply extends between the right and left beads 2 in the tire. A plurality of belt plies are disposed radially outwardly of the carcass ply in the tread 1. A bead core is embedded in each of the right and left beads 2, and the opposing ends are turned up around the bead cores from inner side of the tire towards the outer side thereof.

The tread 1 has an radially inner surface 1a facing the cavity 4, and a plurality (two in the drawing) of belt-shaped sound absorbing members 5 are mounted on the radially inner surface 1a at prescribed intervals circumferentially of the tire by pressing of a fixing elastic band 6. The belt-shaped sound absorbing members 5 are formed of a porous material having an apparent density of 10 kg/m³ to 70 kg/m³ defined by JIS (Japanese Industrial Standard) K6400, and the fixing elastic band 6 is formed of a synthetic resin having a high tensile modulus of elasticity.

If the apparent density of the belt-shaped sound absorbing members 5 exceeds 70 kg/m³, it is difficult to provide effective absorbing ability, and the weight increases, because of a decrease in the volume occupied by pores. If the apparent density of the belt-shaped sound absorbing members 5 is less than 10 kg/m³, it is difficult to obtain good absorbing ability because of an increase in the volume of the pores occupying the porous structure. The apparent density of the belt-shaped sound absorbing members 5 is preferably 15 kg/m³ to 40 kg/m³.

There is no particular limitation to the number and tire-circumferential intervals of the belt-shaped sound absorbing members 5 mounted on the radially inner surface 1a of the tread 1; however, it is preferable in terms of effective noise reduction that the total longitudinal length of the belt-shaped sound absorbing members 5 be equal to or greater than 30% of the entire circumferential length of the radially inner surface 1a. The upper limit is preferably equal to or less than 80% thereof in terms of a noise reduction effect due to changes in the cross section of the cavity. More preferably, it is ranged from 40% to 60%. The belt-shaped sound absorbing members 5 are preferably of the same length and circumferentially placed at an equal interval in view of maintenance of weight balance.

As described above, since the density of the belt-shaped sound absorbing members 5 is adjusted to the particular range, and the belt-shaped sound absorbing members 5 are disposed at prescribed intervals on the radially inner surface 1a of the tread 1, an acoustic cavity resonance sound can be significantly reduced by a combination of an sound absorbing effect by the belt-shaped sound absorbing members 5 and a noise reduction effect due to changes of the resonance frequency according to tire-circumferential changes in the cross section of the cavity. The belt-shaped sound absorbing members 5 are pressed on the radially inner surface 1a of the tread 1, using the elastic force of the fixing elastic band 6, so the belt-shaped sound absorbing members 5 can stably be mounted thereon without easily separating therefrom.

Since the belt-shaped sound absorbing members 5 and fixing elastic band 6 are mounted on the tire T after a curing process, there is no need to modify production facilities or the like for tires and rims, and the belt-shaped sound absorbing members 5 and fixing elastic band 6 are applicable to existing tires. The belt-shaped sound absorbing members 5 and fixing elastic band 6 are mounted on the radially inner surface 1a of the tread 1 of the tire T, so the mounting operation of the tire on a rim is not obstructed.

The porous material of which the above belt-shaped sound absorbing members 5 are formed is preferably a resin foam, and in particular a urethane foam because it is resistant to compressive deformation by the tire inner pressure. A foamed body formed of the resin form is preferably made such that adjacent ones of the bubbles of the foamed body communicate with each other to form a continuous bubble. The belt-shaped sound absorbing members 5 may be formed of a woven or non-woven fabric instead of the resin foam.

The belt-shaped sound absorbing members 5 are preferably arranged so as to have an acoustic absorption coefficient at a frequency of 200 Hz that is 10% or greater in terms of effective absorption of the cavity resonance sound. As the acoustic absorption coefficient is higher, it is better; there is no particular limitation to the upper limit thereof. However, the upper limit of sound absorbing members which can be produced with existing technologies is about 20%. The acoustic absorption coefficient referred in the present invention is an acoustic absorption coefficient defined by JIS A1405.

The thickness A of the belt-shaped sound absorbing members 5 is preferably 5 mm to 50 mm. If the thickness A of the belt-shaped sound absorbing members 5 is greater than 50 mm, the belt-shaped sound absorbing members 5 are so thick that they are subject to damage due to repeated deformation caused when the tire engages the ground. If the thickness A of the belt-shaped sound absorbing members 5 is less than 5 mm, the belt-shaped sound absorbing members 5 are so thin that they can not provide a sufficient noise reduction effect and are also subject to damage due to repeated deformation caused when the tire engages the ground. More preferably, the thickness A of the belt-shaped sound absorbing members 5 is 10 mm to 30 mm.

The material of which the fixing elastic band 6 is formed of preferably includes a synthetic resin such as a polypropylene resin. When the polypropylene resin is used, a polypropylene resin having flexural modulus of elasticity ranged from 1100 MPa to 1800 MPa is preferably used. If the flexural modulus of elasticity is less than 1100 MPa, the elasticity of the fixing elastic band 6 is so low that it is difficult for the fixing elastic band 6 to provide a sufficient function as an elastic band. If the flexural modulus of elasticity exceeds 1800 MPa, the stiffness of the fixing elastic band 6 is so high that they are subject to damage, decreasing durability, because the fixing elastic band 6 can not follow deformation caused when the tire engages the ground. More preferably, the flexural modulus of elasticity is 1300 MPa to 1700 MPa. The flexural modulus of elasticity referred here is determined according to the test method for flexural modulus defined by ASTM (AMERICAN SOCIETY FOR TESTING AND MATERIAL).

The width Wg of the fixing elastic band 6 is preferably in the range of 10 mm to 30 mm; the width may be suitably decided according to the stiffness of the fixing elastic band 6 within the range. If the width Wg of the fixing elastic band 6 is less than 10 mm, the fixing elastic band 6 is deficient in strength. If the width Wg of the fixing elastic band 6 is greater than 30 mm, it is not preferable because of an increase in weight.

The thickness u of the fixing elastic band 6 is preferably 0.5 mm to 2.0 mm. If the thickness u of the fixing elastic band 6 is less than 0.5 mm, the fixing elastic band 6 is deficient in strength. If the thickness u of the fixing elastic band 6 exceeds 2.0 mm, the bending stiffness of the fixing elastic band 6 is so high that it is subject to damage. More preferably, the thickness u of the fixing elastic band 6 is 0.75 mm to 1.5 mm.

Figure 2:
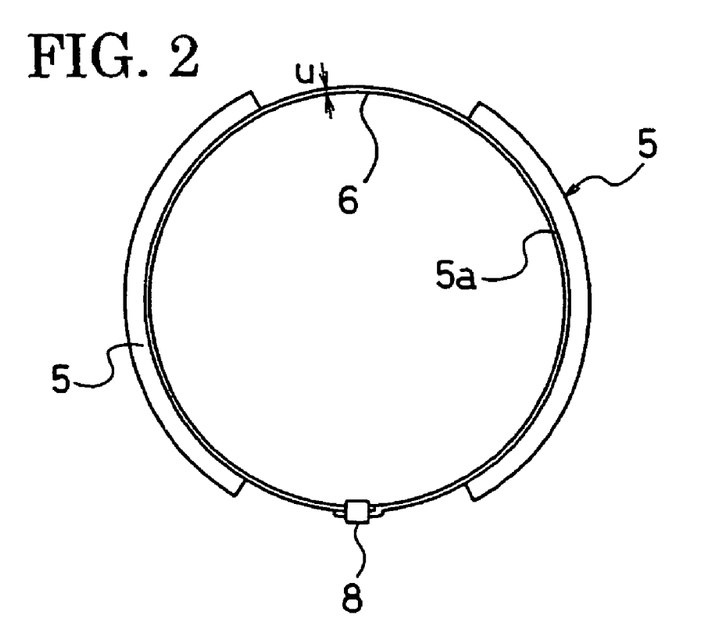
FIG. 2 is a side view showing belt-shaped sound absorbing members and a fixing elastic band shown in FIG. 1.
Figure 3:
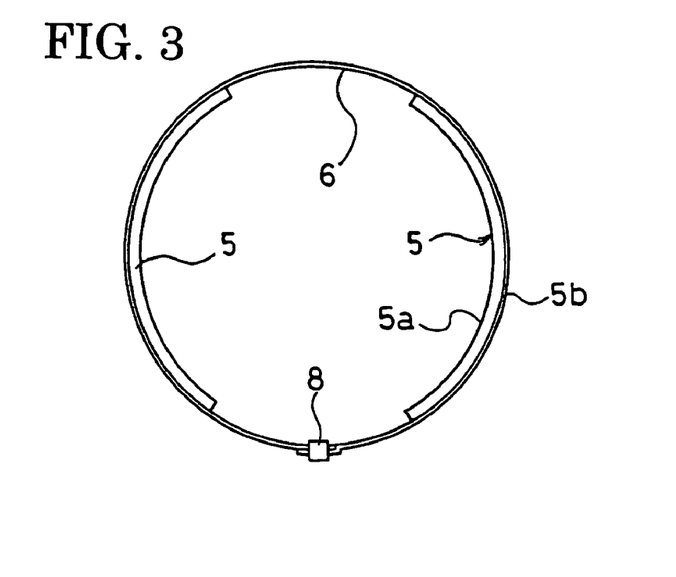
FIG. 3 is a side view showing another example of a way to mount the belt-shaped sound absorbing members by the fixing elastic band.

FIG. 2 shows an example where the belt-shaped sound absorbing members 5 are mounted on the radially inner surface 1a of the tread 1 in a pressing manner by the fixing elastic band 2 which is placed on the radially inner surfaces 5a of the belt-shaped sound absorbing members 5; however, as shown in FIG. 3, the belt-shaped sound absorbing members 5 may be mounted on the radially inner surface 1a of the tread 1 by the fixing elastic band 2 which is placed on the radially outer surfaces 5b of the belt-shaped sound absorbing members 5. The fixing elastic band 6 is preferably secured to the belt-shaped sound absorbing members 5 with an adhesive or the like for attachment of the belt-shaped sound absorbing members 5.

As shown in FIG. 2, it is preferred that the belt-shaped sound absorbing members 5 be mounted on the radially inner surface 1a of the tread 1 by coupling both longitudinal ends of the fixing elastic band 6 with a coupling member 8. Since the circumferential length of the fixing elastic band 6 coupled by the coupling member 8 is adjustable, belt-shaped sound absorbing members 5 and a fixing elastic band 6 in common can be used for various types of pneumatic tires. The fixing elastic band 6 may be formed as a circular hoop having a length corresponding to a tire size without using the coupling member 8, as is obvious.

The radially inner surface 5a of each belt-shaped sound absorbing member 5 is preferably formed to have a lot of uneven portions in order to increase the surface area for enhancement of the absorbing effect thereof. There is no particular limitation to the shape of the uneven surface; the uneven surface may be formed as shown in FIGS. 4 to 8, for example.

Figure 4:
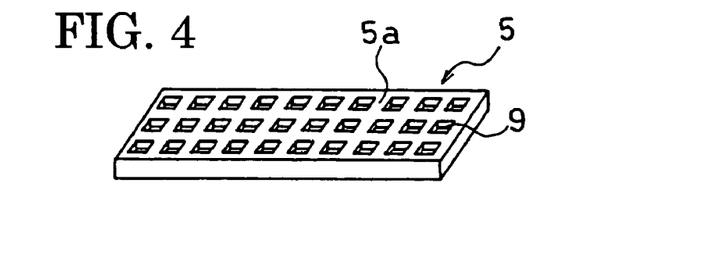
FIG. 4 is a perspective view showing an example of a belt-shaped sound absorbing member having an uneven radially inner surface.
Figure 5:
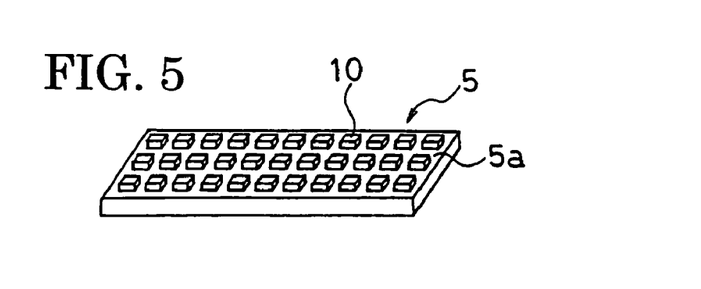
FIG. 5 is a perspective view showing another example of the belt-shaped sound absorbing member having an uneven radially inner surface.
Figure 6:
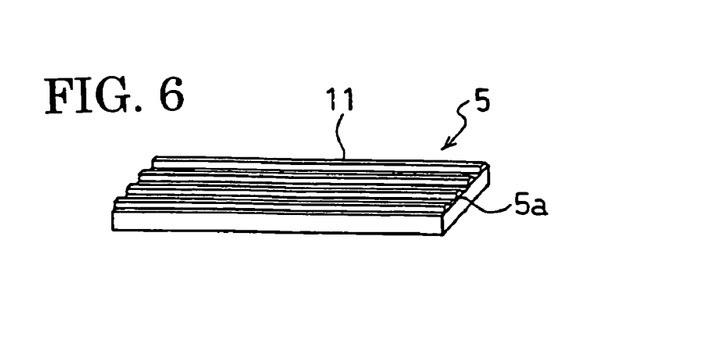
FIG. 6 is a perspective view showing still another example of the belt-shaped sound absorbing member having an uneven radially inner surface.
Figure 7:
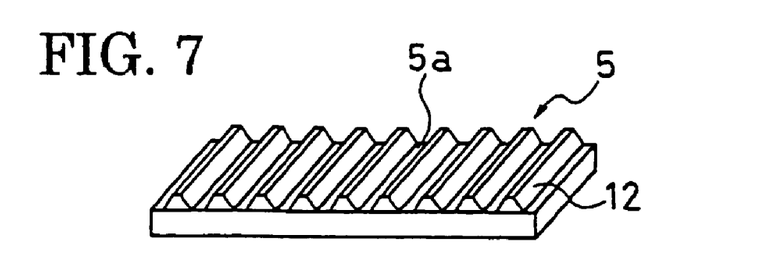
FIG. 7 is a perspective view showing still another example of the belt-shaped sound absorbing member having an uneven radially inner surface.
Figure 8:
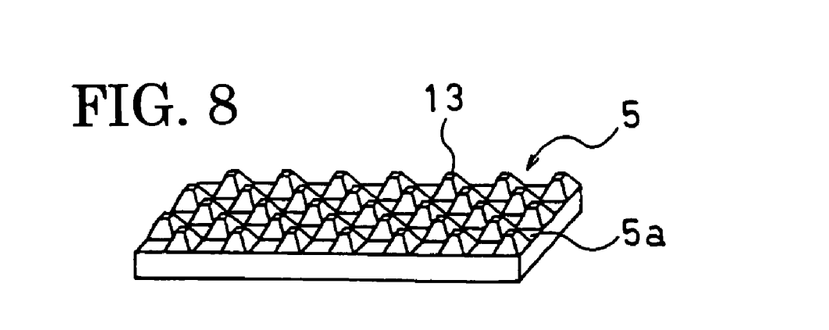
FIG. 8 is a perspective view showing still another example of the belt-shaped sound absorbing member having an uneven radially inner surface.

The uneven surface shown in FIG. 4 is formed such that recesses 9 are longitudinally and widthwisely provided at prescribed intervals in the flat radially inner surface 5a. The uneven surface shown in FIG. 5 is formed such that projections 10 are longitudinally and widthwisely provided at prescribed intervals on the flat radially inner surface 5a. The uneven surface shown in FIG. 6 is formed such that longitudinally extending projections 11 are widthwisely provided at prescribed intervals on the flat radially inner surface 5a. The uneven surface shown in FIG. 7 is formed such that widthwisely extending projections 11 are longitudinally provided at prescribed intervals on the flat radially inner surface 5a. The uneven surface shown in FIG. 8 is formed such that projections 13 are longitudinally and widthwisely provided at prescribed intervals on the flat radially inner surface 5a and adjacent rows of projections 13 are placed offset to each other.

When the radially inner surface 5a has such recesses or projections, the unevenness, that is, the depth of the recesses or the height of the projections is preferably equal to or less than 20 mm. If the depth of the recesses or the height of the projections is greater than 20 mm, it is not preferable because processing tasks are troublesome.

The radially inner surface 5a of the belt-shaped sound absorbing member 5 has recesses or projections in FIGS. 4 to 8; however, the flat radially inner surface 5a may have recesses and projections.

Figure 9:
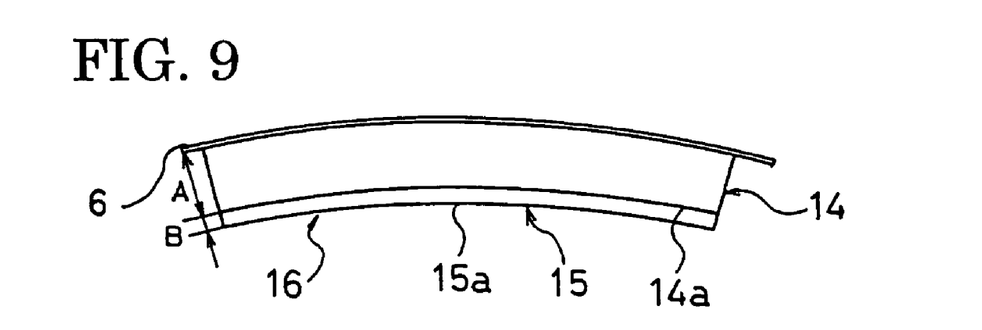
FIG. 9 is a side view showing an example of a belt-shaped sound absorbing member having a layered structure.

In the above embodiment, the belt-shaped sound absorbing members 5 each consisting of a single layer are used; however, a belt-shaped sound absorbing member comprising plural layers may be used as shown in FIG. 9. FIG. 9 shows a belt-shaped sound absorbing member 16 comprising two belt-shaped sound absorbing layers 14 and 15. The belt-shaped sound absorbing layer 14, which is located on the outer side in contact with the radially inner surface 1a of the tread 1, has the same structure as the above belt-shaped sound absorbing layers 5, absorbing the cavity resonance sound. The belt-shaped sound absorbing layer 15, which is an inner one disposed radially inwardly of the outer belt-shaped sound absorbing layer 14, is formed of a porous material having sound absorbing properties different from those of the outer belt-shaped sound absorbing layer 14. By providing the inner belt-shaped sound absorbing layer 15 having such different sound absorbing properties, an effect of absorbing tire noise other than the cavity resonance sound can be offered as well.

The inner belt-shaped sound absorbing layer 15 may be formed of a porous material having an acoustic absorption coefficient of 40% or greater at a frequency of 1 kHz, for example. This can effectively reduce tire noise in the range from 800 Hz to 2 kHz. As the acoustic absorption coefficient is higher, it is better; there is no particular limitation to the upper limit thereof. However, the upper limit of sound absorbing members which can be produced with existing technologies is about 60%.

Figure 10:
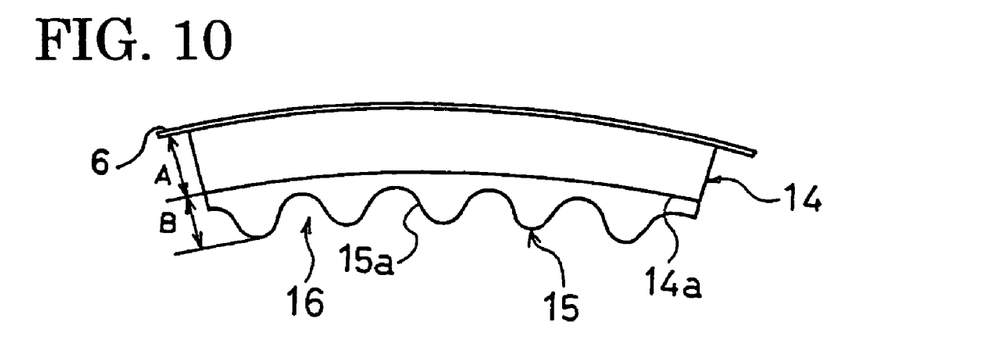
FIG. 10 is a side view showing another example of the belt-shaped sound absorbing member having a layered structure.

The inner belt-shaped sound absorbing layer 15 is arranged such that the radially inner surface 15a thereof exposed to the cavity 4 is flat in FIG. 9, but the radially inner surface 15a may be uneven, as shown in FIG. 10.

The apparent density of the inner belt-shaped sound absorbing layer 15 is preferably in the range of 10 kg/m$^3$ to 70 kg/m$^3$ as that of the belt-shaped sound absorbing members 5 is. The porous material of which the inner belt-shaped sound absorbing layer 15 is formed preferably includes a resin foam such as a urethane foam, as that of belt-shaped sound absorbing members 5 does. By suitably adjusting the size of pores of the inner belt-shaped sound absorbing layer 15 and the modulus thereof, the inner belt-shaped sound absorbing layer 15 having an acoustic absorption coefficient of 40% or greater at a frequency of 1 kHz can be formed.

When the outer belt-shaped sound absorbing layer 14 and inner belt-shaped sound absorbing layer 15 are used as shown in FIGS. 9 and 10, it is preferable that the thickness A of the outer belt-shaped sound absorbing layer 14 and the thickness B of inner belt-shaped sound absorbing layer 15 be in the range from 5 mm to 45 mm, respectively, and the total thickness of the outer belt-shaped sound absorbing layer 14 and inner belt-shaped sound absorbing layer 15 does not exceed 50 mm. If the thickness A of the outer belt-shaped sound absorbing layer 14 and the thickness B of inner belt-shaped sound absorbing layer 15 are less than 5 mm, a sufficient noise reduction effect can not be provided. If the total thickness exceeds 50 mm, the belt-shaped sound absorbing member 16 is so thick that it is subject to damage due to repeated deformation caused when the tire engages the ground.

Instead of the above-described structure, the belt-shaped sound absorbing member 16 may comprise an inner belt-shaped sound absorbing layer 15 structured so as to absorb the cavity resonance sound, and an outer belt-shaped sound absorbing layer 14 formed of a porous material having sound absorbing properties different from those of the inner belt-shaped sound absorbing layer 15; one of the belt-shaped sound absorbing layers 14 and 15 may be formed to have an acoustic absorption coefficient of 10% or greater at a frequency of 200 Hz to thereby absorb the cavity resonance sound.

The belt-shaped sound absorbing member 16 may also comprise an inner belt-shaped sound absorbing layer 15 having an acoustic absorption coefficient of 10% or greater at a frequency of 200 Hz to effectively absorb the sound of frequency ranged from 200 Hz to 300 Hz, and an outer belt-shaped sound absorbing layer 14 formed of a porous material having a tensile strength higher than that of the inner belt-shaped sound absorbing layer 15. The outer belt-shaped sound absorbing layer 14 in contact with the radially inner surface 1a of the tread 1 is repeatedly chafed against the radially inner surface 1a; use of a sound absorbing layer with a high tensile strength therefor can extend the service life of the belt-shaped sound absorbing member 16.

Figure 11:
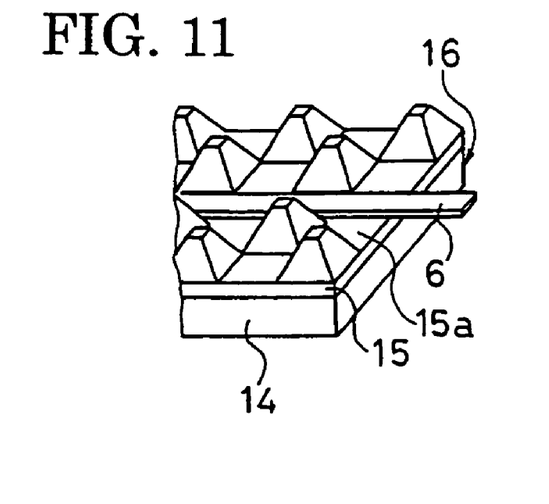
FIG. 11 is a partial perspective view showing an example of a way to attach the fixing elastic band to the belt-shaped sound absorbing member having a layered structure.
Figure 12:
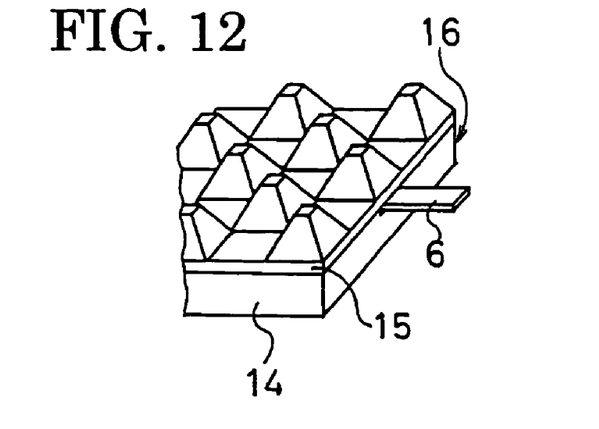
FIG. 12 is a partial perspective view showing another example of the way to attach the fixing elastic band to the belt-shaped sound absorbing member having a layered structure.
Figure 13:
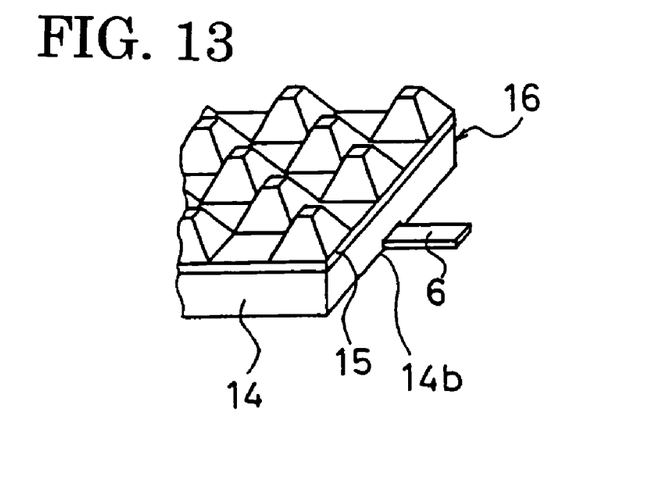
FIG. 13 is a partial perspective view showing still another example of the way to attach the fixing elastic band to the belt-shaped sound absorbing member having a layered structure.

The fixing elastic band 6 can be attached to the belt-shaped sound absorbing member 16 having such a layered structure, as shown in FIGS. 11 to 13. Referring to FIG. 11, the fixing elastic band 6 is attached to the radially inner surface 15a of the inner belt-shaped sound absorbing layer 15; referring to FIG. 12, the fixing elastic band 6 is placed between the outer belt-shaped sound absorbing layer 14 and the inner belt-shaped sound absorbing layer 15; referring to FIG. 13, the fixing elastic band 6 is attached to the radially outer surface 14a of the outer belt-shaped sound absorbing layer 14. In FIGS. 11 to 13, examples of the belt-shaped sound absorbing layer 15 each have an inner belt-shaped sound absorbing layer 15 the radially inner surface 15a of which is uneven; the fixing elastic band can be attached to the belt-shaped sound absorbing member 16 having an inner belt-shaped sound absorbing layer 15 the radially inner surface 15a of which is flat in the same way.

Figure 14:
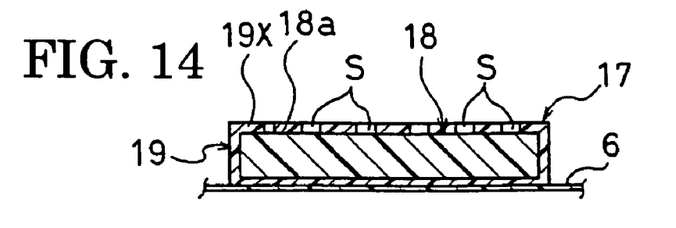
FIG. 14 is a cross-sectional view showing still another example of the belt-shaped sound absorbing member having a layered structure.

Referring to FIG. 14, there is shown an example of another belt-shaped sound absorbing member. This belt-shaped sound absorbing member 17 comprises a first belt-shaped sound absorbing layer 18 that is formed as the above-described belt-shaped sound absorbing member 5 and absorbs the cavity resonance sound, and a second belt-shaped sound absorbing layer 19 that covers the entire first belt-shaped sound absorbing layer 18. The second belt-shaped sound absorbing layer 19 is formed so as to have sound absorbing properties different from those of the first belt-shaped sound absorbing layer 18.

The second belt-shaped sound absorbing layer 19 has an inner portion 19X that is in contact with the radially inner surface 18a of the first belt-shaped sound absorbing layer 18, and the inner portion 19X has a plurality of holes S through which the tire cavity 4 communicates with the first belt-shaped sound absorbing layer 18. The acoustic energy in the tire cavity 4 enters the first belt-shaped sound absorbing layer 18 through the holes S and is absorbed.

Figure 15:
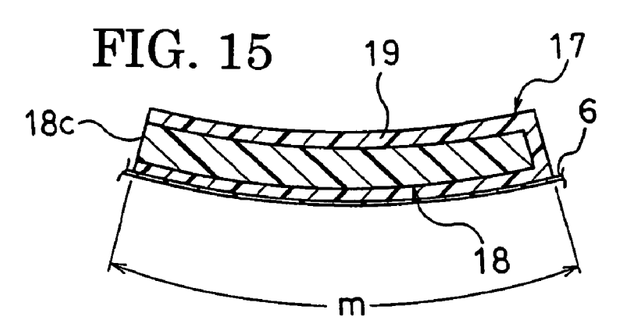
FIG. 15 is a cross-sectional view showing still another example of the belt-shaped sound absorbing member having a layered structure.
Figure 16:
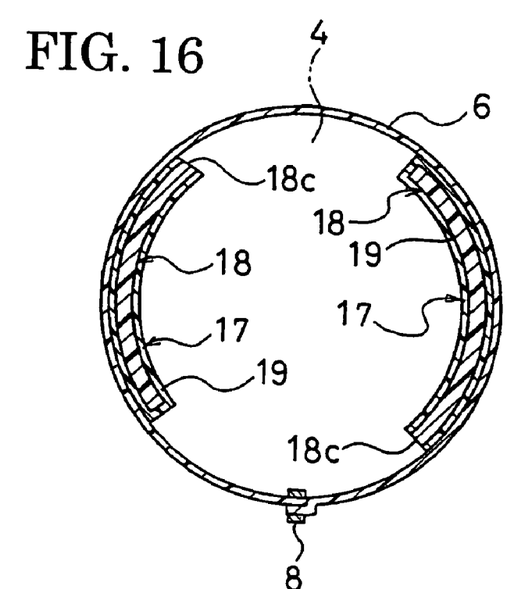
FIG. 16 is a cross-sectional view showing the fixing elastic band and belt-shaped sound absorbing members each comprising the belt-shaped sound absorbing member shown in FIG. 15 in a state where the belt-shaped sound absorbing members are mounted on the inner surface of a tire by the fixing elastic band.

The belt-shaped sound absorbing member 17 may be arranged, as shown in FIG. 15, that the above second belt-shaped sound absorbing layer 19 is disposed outwardly of the first belt-shaped sound absorbing layer 19 so as to expose only one longitudinal side face 18c of the first belt-shaped sound absorbing layer 18 to the tire cavity 4. It is preferred that the belt-shaped sound absorbing member 17 shown in FIG. 15 have a longitudinal length m that is about 25% of the entire circumferential length of the radially inner surface 1a of the tread 1 on which it is mounted, and as shown in FIG. 16, two belt-shaped sound absorbing members 17 be placed at locations opposite to each other with the one longitudinal side faces 18a of the first belt-shaped sound absorbing layers 18 that are exposed to the tire cavity 4 facing to one side. Accordingly, the length of the second belt-shaped sound absorbing layers 19 in the form of cylinders with one ends open and the other ends closed comes close to the length of ¼ period of the wavelength of the cavity resonance sound, which works as resonant type sound absorbers, further increasing an absorbing effect of the cavity resonance sound.

It is preferable that the thicknesses of the first belt-shaped sound absorbing layer 18 and second belt-shaped sound absorbing layer 19 of each of the belt-shaped sound absorbing members 17 shown in FIGS. 14 and 15 be ranged from 5 mm to 45 mm, respectively, and the total thickness of the first belt-shaped sound absorbing layer 18 and second belt-shaped sound absorbing layer 19 does not exceed 50 mm.

EXAMPLE

Prepared were four pneumatic tires each according to the present invention tires 1 to 5, comparison tires 1 and 2 and conventional tire, each having a tire size of 205/65R15, the conventional tire having no belt-shaped sound absorbing member, the present invention tires 1 to 5 and comparison tires 1 and 2 each having belt-shaped sound absorbing members mounted on the radially inner surface of the tread, as shown in FIG. 2, the apparent density of the belt-shaped sound absorbing members being as shown in Table 1.

A urethane foam was used for each belt-shaped sound absorbing member of the four test tires. A polypropylene resin was used for each fixing elastic band, the width thereof being 20 mm, the thickness thereof being 1.0 mm.

Evaluation testing for noise characteristics was conducted on the four test tires according to the following testing method, obtaining the results shown in Table 1.

Noise Characteristics

The four test tires were seated on 15×6½JJ sized rims, inflated to air pressure of 220 kPa, and mounted on a passenger car of 2500 cc displacement; a microphone was installed on the window side of the driver's side in the car at a position corresponding to that of an ear of the driver. Interior noise in the frequency band of 200 Hz to 300 Hz was measured by the microphone while the passenger car was run on a rough-paved road surface at a speed of 50 km/h; the measurement results were represented by an index where the conventional tire was 100. As the value is smaller, noise characteristics are better. The range that is 85 or below in index is a noticeable improvement level in noise by feeling testing.

TABLE 1

|  | Apparent Density (kg/m$^3$) | Noise Characteristics |
| --- | --- | --- |
| Conventional Tire | — | 100 |
| Comparison Tire 1 | 5 | 97 |
| Present Invention Tire 1 | 10 | 84 |
| Present Invention Tire 2 | 15 | 80 |
| Present Invention Tire 3 | 30 | 76 |
| Present Invention Tire 4 | 40 | 79 |
| Present Invention Tire 5 | 70 | 85 |
| Comparison Tire 2 | 80 | 94 |

As seen from Table 1, the present invention tires can reduce the cavity resonance sound in the frequency band of 200 Hz to 300 Hz and improve noise characteristics. The apparent density of the belt-shaped sound absorbing members is adjusted in the range from 15 kg/m$^3$ to 40 kg/m$^3$, whereby noise characteristics can be further improved.

INDUSTRIAL APPLICABILITY

The present invention having the aforementioned excellent effects is very effectively applicable to pneumatic tires to be mounted on vehicles.

What is claimed is:

1. A low noise pneumatic tire having a tread, the tread having a radially inner surface facing to a cavity of the tire, belt-shaped sound absorbing members being mounted on the radially inner surface of the tread at prescribed intervals circumferentially of the tire by a fixing elastic band, the belt-shaped sound absorbing members each comprising at least one layer formed of a porous material having an apparent density of 10 kg/m³ to 70 kg/m³;

wherein the at least one belt-shaped sound absorbing layer comprises two belt-shaped sound absorbing layers, each of the two belt-shaped sound absorbing layers having a thickness ranged from 5 mm to 45 mm, a total thickness of the two belt-shaped sound absorbing layers being 50 mm or less, wherein the two belt-shaped sound absorbing layers comprise an outer belt-shaped sound absorbing layer in contact with the radially inner surface of the tread, and an inner belt-shaped sound absorbing layer disposed radially inwardly of the outer belt-shaped sound absorbing layer, the outer belt-shaped sound absorbing layer being formed of a porous material having a tensile strength higher than that of the inner belt-shaped sound absorbing layer, the inner belt-shaped sound absorbing layer having an acoustic absorption coefficient of 10% or greater at a frequency of 200 Hz.

2. A low noise pneumatic tire according to claim 1, wherein the other of two belt-shaped sound absorbing layers has an acoustic absorption coefficient of 40% or greater at a frequency of 1 kHz.

3. A low noise pneumatic tire having a tread, the tread having a radially inner surface facing to a cavity of the tire, belt-shaped sound absorbing members being mounted on the radially inner surface of the tread at prescribed intervals circumferentially of the tire by a fixing elastic band, the belt-shaped sound absorbing members each comprising at least one layer formed of a porous material having an apparent density of 10 kg/m³ to 70 kg/m³;

wherein the at least one belt-shaped sound absorbing layer comprises a first belt-shaped sound absorbing layer having an acoustic absorption coefficient of 10% or greater at a frequency of 200 Hz, and a second belt-shaped sound absorbing layer that covers the entire first belt-shaped sound absorbing layer and has a sound absorbing property different from that of the first belt-shaped sound absorbing layer, the second belt-shaped sound absorbing layer including an inner portion having a plurality of holes through which the tire cavity communicates with the first belt-shaped sound absorbing layer.

4. A low noise pneumatic tire according to claim 3, wherein each of the first belt-shaped sound absorbing layer and second belt-shaped sound absorbing layer has a thickness ranged from 5 mm to 45 mm, a total thickness of the first belt-shaped sound absorbing layer and second belt-shaped sound absorbing layer being 50 mm or less.

5. A low noise pneumatic tire having a tread, the tread having a radially inner surface facing to a cavity of the tire, belt-shaped sound absorbing members being mounted on the radially inner surface of the tread at prescribed intervals circumferentially of the tire by a fixing elastic band, the belt-shaped sound absorbing members each comprising at least one layer formed of a porous material having an apparent density of 10 kg/m³ to 70 kg/m³;

wherein the at least one belt-shaped sound absorbing layer comprises a first belt-shaped sound absorbing layer having an acoustic absorption coefficient of 10% or greater at a frequency of 200 Hz, and a second belt-shaped sound absorbing layer that covers the first belt-shaped sound absorbing layer so as to expose only one longitudinal side face of the first belt-shaped sound absorbing layer 18 to the tire cavity 4 and has a sound absorbing property different from that of the first belt-shaped sound absorbing layer.

6. A low noise pneumatic tire according to claim 5, wherein the first belt-shaped sound absorbing layer covered with the second belt-shaped sound absorbing layer has a longitudinal length that is substantially 25% of an entire circumferential length of the radially inner surface of the tread, two belt-shaped sound absorbing members each having the first belt-shaped sound absorbing layer covered with the second belt-shaped sound absorbing layer being placed at locations opposite to each other with the one longitudinal side faces thereof exposed to the tire cavity facing to one side.

7. A low noise pneumatic tire having a tread, the tread having a radially inner surface facing to a cavity of the tire, belt-shaped sound absorbing members being mounted on the radially inner surface of the tread at prescribed intervals circumferentially of the tire by a fixing elastic band, the belt-shaped sound absorbing members each comprising at least one layer formed of a porous material having an apparent density of 10 kg/m³ to 70 kg/m³;

wherein the fixing elastic band is formed of a synthetic resin, the fixing elastic band being 10 mm to 30 mm in width, and 0.5 mm to 2.0 mm in thickness.

8. A low noise pneumatic tire according to claim 7, wherein the fixing elastic band is formed of a polypropylene resin having flexural modulus of elasticity ranged from 1100 MPa to 1800 MPa.

* * * * *